(12) United States Patent
Choi (10) Patent No.: US 10,081,388 B2
(45) Date of Patent: Sep. 25, 2018

(54) TORQUE SENSOR

(71) Applicant: LG INNOTEK CO., LTD., Seoul (KR)

(72) Inventor: Ho Min Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/108,197

(22) PCT Filed: Dec. 12, 2014

(86) PCT No.: PCT/KR2014/012276
§ 371 (c)(1),
(2) Date: Jun. 24, 2016

(87) PCT Pub. No.: WO2015/099339
PCT Pub. Date: Jul. 2, 2015

(65) Prior Publication Data
US 2016/0325781 A1 Nov. 10, 2016

(30) Foreign Application Priority Data
Dec. 26, 2013 (KR) .......................... 10-2013-0164263

(51) Int. Cl.
*G01L 3/04* (2006.01)
*B62D 6/10* (2006.01)
(Continued)

(52) U.S. Cl.
CPC ........... *B62D 6/10* (2013.01); *B62D 15/0215* (2013.01); *G01L 3/104* (2013.01);
(Continued)

(58) Field of Classification Search
CPC ... G01L 3/104; G01L 3/10; G01L 3/04; G01L 3/101; G01L 3/02; G01L 3/1435;
(Continued)

(56) References Cited

U.S. PATENT DOCUMENTS 5,646,523 A * 7/1997 Kaiser .................... B62D 15/02
180/400
6,948,383 B2 * 9/2005 Wilczek ................. G01D 5/145
73/862.331

(Continued)

FOREIGN PATENT DOCUMENTS

KR 10-2012-0004031 A 1/2012
KR 10-2012-0069869 A 6/2012
(Continued)

*Primary Examiner* — Jonathan Dunlap
(74) *Attorney, Agent, or Firm* — Birch, Stewart, Kolasch & Birch, LLP (57) ABSTRACT

Disclosed is a torque sensor connected with a first shaft and a second shaft, the torque sensor including a first case, a second case coupled with the first case, a third case coupled with the second case, a torque sensor module disposed between the first case and the second case and connected with the first shaft and the second shaft, and an angle sensor module disposed between the second case and the third case. The second case includes first fixing units formed on an outer circumferential surface thereof, and the first fixing units are rotationally symmetrical with respect to a longitudinal axis.

10 Claims, 6 Drawing Sheets

(51) Int. Cl.
  *G01L 3/10* (2006.01)
  *B62D 15/02* (2006.01)
  *G01L 25/00* (2006.01)
  *G01L 3/02* (2006.01)
  *G01L 3/14* (2006.01)
  *G01L 5/22* (2006.01)

(52) U.S. Cl.
  CPC ...... *B62D 15/0235* (2013.01); *B62D 15/0245* (2013.01); *G01L 3/02* (2013.01); *G01L 3/04* (2013.01); *G01L 3/10* (2013.01); *G01L 3/101* (2013.01); *G01L 3/1435* (2013.01); *G01L 5/221* (2013.01); *G01L 25/003* (2013.01)

(58) Field of Classification Search
  CPC ... G01L 5/221; G01L 25/003; B62D 15/0215; B62D 15/0245; B62D 15/0235
  USPC ......... 73/117.02, 862.331–862.336, 862.325, 73/862.191, 862.193, 862.195, 862.08, 73/862.326; 324/207.25, 207.22, 207.2
  See application file for complete search history.

(56) References Cited

U.S. PATENT DOCUMENTS

| | | | | |
|---|---|---|---|---|
| 6,956,198 B2 * | 10/2005 | Alsobrooks | ............... | G01D 5/04 250/231.13 |
| 7,021,161 B2 * | 4/2006 | Recio | ............... | G01D 5/04 73/862 |
| 7,406,884 B2 * | 8/2008 | Jerems | ............... | G01L 5/221 73/862.331 |
| 7,415,896 B2 * | 8/2008 | Khoury | ............... | G01L 3/106 73/862.193 |
| 7,415,898 B2 * | 8/2008 | Ishihara | ............... | B62D 6/10 73/862.331 |
| 7,726,208 B2 * | 6/2010 | Hoeller | ............... | B62D 6/10 324/207.17 |
| 7,841,231 B2 * | 11/2010 | Kang | ............... | B62D 15/0215 73/117.02 |
| 8,047,066 B2 * | 11/2011 | Kang | ............... | B62D 15/0215 73/117.02 |
| 8,375,810 B2 * | 2/2013 | Bae | ............... | G01L 3/10 73/862.334 |
| 8,397,588 B2 * | 3/2013 | Kang | ............... | G01B 7/30 73/862.08 |
| 8,561,481 B2 * | 10/2013 | Bae | ............... | G01L 3/104 73/862.334 |
| 8,590,370 B2 * | 11/2013 | Lee | ............... | B62D 6/10 73/117.02 |
| 8,813,578 B2 * | 8/2014 | Kaess | ............... | B62D 6/10 324/207.2 |
| 8,875,588 B2 * | 11/2014 | Kim | ............... | B62D 6/10 73/862.325 |
| 8,943,879 B2 * | 2/2015 | Kang | ............... | B62D 6/10 73/117.02 |
| 8,955,396 B2 * | 2/2015 | Bae | ............... | G01L 3/104 73/862.334 |
| 9,389,148 B2 * | 7/2016 | Lee | ............... | B62D 6/10 |
| 9,500,543 B2 * | 11/2016 | Lee | ............... | G01L 3/104 |
| 2003/0010138 A1 * | 1/2003 | Madni | ............... | G01L 5/221 73/862.337 |
| 2004/0261546 A1 * | 12/2004 | Wilczek | ............... | G01D 5/145 73/862.333 |
| 2005/0050966 A1 * | 3/2005 | Recio | ............... | G01D 5/04 73/862.333 |
| 2006/0081070 A1 * | 4/2006 | Madni | ............... | G01D 5/202 73/862.325 |
| 2008/0150519 A1 * | 6/2008 | Hoeller | ............... | B62D 6/10 324/207.2 |
| 2009/0289623 A1 * | 11/2009 | Sano | ............... | G01D 11/245 324/207.25 |
| 2010/0319466 A1 * | 12/2010 | Bae | ............... | G01L 3/104 73/862.325 |
| 2011/0030463 A1 * | 2/2011 | Kang | ............... | B62D 15/0215 73/117.02 |
| 2011/0214515 A1 * | 9/2011 | Kim | ............... | B62D 6/10 73/862.325 |
| 2011/0247408 A1 * | 10/2011 | Lee | ............... | B62D 6/10 73/117.02 |
| 2012/0152034 A1 * | 6/2012 | Kaess | ............... | B62D 6/10 73/862.333 |
| 2012/0312088 A1 * | 12/2012 | Kang | ............... | B62D 6/10 73/117.02 |
| 2013/0125668 A1 * | 5/2013 | Bae | ............... | G01L 3/104 73/862.325 |
| 2013/0305843 A1 * | 11/2013 | Lee | ............... | G01L 3/104 73/862.325 |
| 2014/0013863 A1 * | 1/2014 | Bae | ............... | G01L 3/104 73/862.333 |
| 2014/0047914 A1 * | 2/2014 | Lee | ............... | B62D 6/10 73/117.02 |
| 2015/0090051 A1 * | 4/2015 | Lee | ............... | G01L 3/104 73/862.193 |
| 2015/0300898 A1 * | 10/2015 | Lee | ............... | G01L 3/104 73/862.325 |

FOREIGN PATENT DOCUMENTS

| | | |
|---|---|---|
| KR | 10-2012-0133404 A | 12/2012 |
| KR | 10-2013-0011660 A | 1/2013 |
| KR | 10-1243535 B1 | 3/2013 |

* cited by examiner

TORQUE SENSOR

TECHNICAL FIELD

The present invention relates to a torque sensor used for a steering system.

BACKGROUND ART

Generally, an auxiliary steering system which assists steering with separate power is used as a system for guaranteeing a steering stability of a vehicle. As the auxiliary steering system, a system using a hydraulic pressure was used, but an electronic power steering (EPS) system which has less loss of power and excellent accuracy is recently being used.

The EPS system guarantees steering stability and provides a quick restoring force by driving a motor in an electronic control unit according to a driving condition and driver operation information detected by a speed sensor, a torque sensor, an angle sensor, and the like, thereby allowing a driver to safely drive a vehicle.

The speed sensor detects a driving speed of a vehicle being driven, the torque sensor detects torque applied to a steering shaft and outputs an electric signal which is proportional to the detected torque, and the angle sensor is a device for outputting an electric signal proportional to a rotation angle of a steering shaft.

Recently, a torque angle sensor (TAS), which is a device in which an angle sensor and a torque sensor which detect information on a steering wheel operation of a driver are configured into one sensor, has been proposed among the sensors and has been increasingly used.

The torque sensor detects a magnetic field according to a distortion difference between a rotor and a stator and transmits the magnetic field to an electronic control device.

When a driver rotates a steering wheel, a main gear attached to the steering wheel rotates according to the rotation to generate a rotation angle difference. In this case, a magnetic element recognizes magnetic fields of magnets attached to sub-gears engaged to the main gear, and the angle sensor transmits a signal to the electronic control device.

However, the TAS has a structure in which the TAS cannot be divided into the torque sensor and the angle sensor, and thus the torque sensor, the angle sensor, and the TAS are assembled on different lines. Therefore, there are problems of increases in personnel and manufacturing costs.

DISCLOSURE

Technical Problem

The present invention is directed to providing a torque sensor capable of reducing manufacturing costs by reducing the number of components.

Technical Solution

One aspect of the present invention provides a torque sensor comprising: a first case; a second case coupled with the first case; and a torque sensor module disposed between the first case and the second case, wherein the second case includes first fixing units formed on an outer circumferential surface thereof, and the first fixing units are rotationally symmetrical with respect to a longitudinal axis.

In the torque sensor of the present invention, the second case includes second fixing units formed on the outer circumferential surface thereof.

In the torque sensor of the present invention, the torque sensor module includes a first printed circuit board disposed between the first case and the second case.

In the torque sensor of the present invention, the first fixing units include screw holes.

In the torque sensor of the present invention, wherein the torque sensor module includes: a stator unit including a holder fixing a first stator ring and a second stator ring; a rotor unit disposed in the stator unit; a torque magnetic element detecting a magnetic field generated between the rotor unit and the stator unit; a first printed circuit board electrically connected with the torque magnetic element; and a collector unit disposed between the torque magnetic element and the stator unit.

In the torque sensor of the present invention, the rotor unit is coupled with a first shaft, and the stator unit is coupled with a second shaft.

In the torque sensor of the present invention, the collector unit includes a first collector disposed on a side of the first stator ring, and a second collector disposed on a side of the second stator ring, and the first collector is disposed in the first case, and the second collector is disposed in the second case.

In the torque sensor of the present invention, the torque sensor further comprises a third case coupled with the second case.

In the torque sensor of the present invention, the torque sensor further comprises an angle sensor module disposed between the second case and the third case.

In the torque sensor of the present invention, the angle sensor module includes: a main gear; at least one sub-gear engaged and coupled with the main gear; an angle magnet integrally rotating along with the sub-gear; an angle magnetic element detecting a rotation of the angle magnet; and a second printed circuit board electrically connected with the angle magnetic element.

In the torque sensor of the present invention, the second case includes a seating unit in which the sub-gear is rotatably disposed.

In the torque sensor of the present invention, the torque sensor module includes a first printed circuit board disposed between the first case and the second case, and the angle sensor module includes a second printed circuit board disposed between the second case and the third case.

In the torque sensor of the present invention, the torque sensor further comprises a connector electrically connected with the first printed circuit board and the second printed circuit board, wherein the connector includes: a connector housing; a first wire connected with the first printed circuit board; a second wire connected with the second printed circuit board; a first interface connected with the first wire; and a second interface connected with the second wire.

In the torque sensor of the present invention, the torque sensor further comprises a third case coupled with the second case.

In the torque sensor of the present invention, the first fixing units are coupled with the first case, and second fixing units are coupled with the third case.

Advantageous Effects

According to the present invention, a torque sensor, an angle sensor, and a torque angle sensor (TAS) can be manufactured on one line, thereby reducing manufacturing costs.

MODES OF THE INVENTION

While the invention may have various modifications and alternative forms, specific embodiments thereof are shown by way of example in the drawings and will herein be described in detail.

It should be understood, however, that there is no intent to limit the invention to the particular forms disclosed, and on the contrary, the invention is to cover all modifications, equivalents, and alternatives falling within the spirit and scope of the invention.

In the present invention, it should be further understood that the terms "comprise, "comprising", "include", and/or "including" when used in this specification, specify the presence of stated features, integers, steps, operations, elements, and/or components, but do not preclude the presence or addition of one or more other features, integers, steps, operations, elements, and/or components.

Hereinafter, embodiments of the present invention will be described in detail with reference to the accompanying drawings. The same reference numerals will be used to describe the same or like components, and a redundant description thereof will be omitted.

Figure 1:
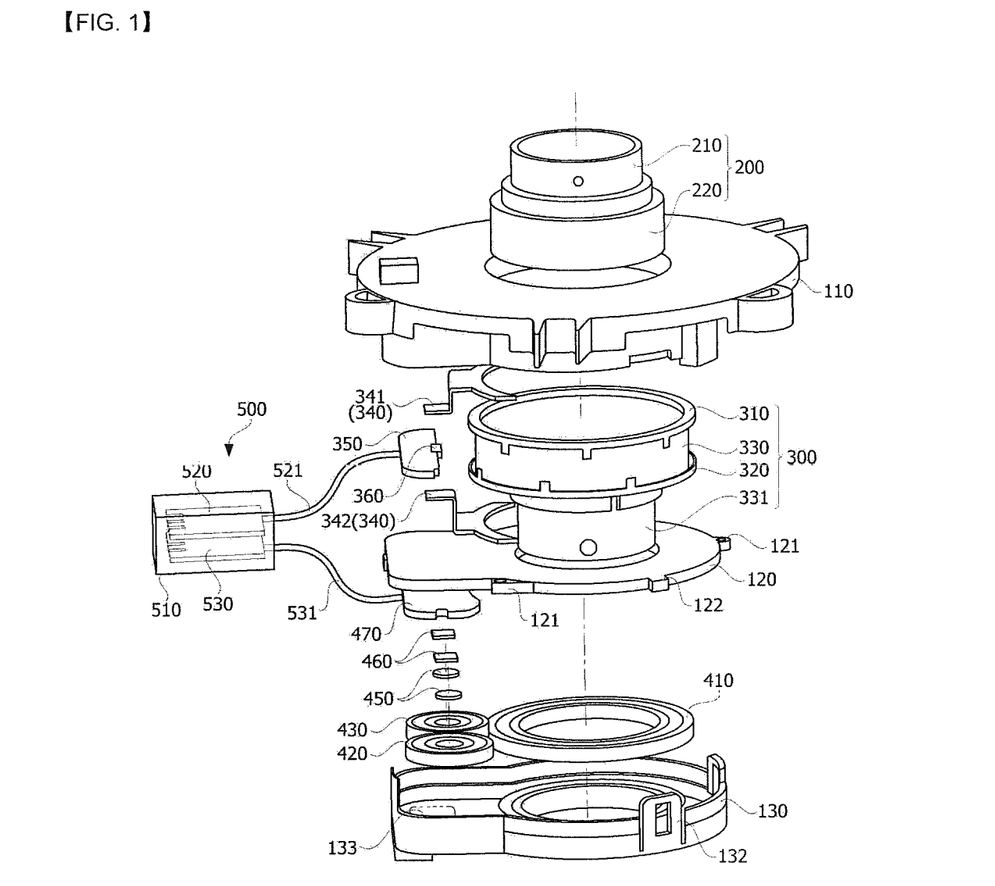
FIG. 1 is an exploded perspective view of a torque angle sensor (TAS) according to an embodiment of the present invention.
Figure 2:
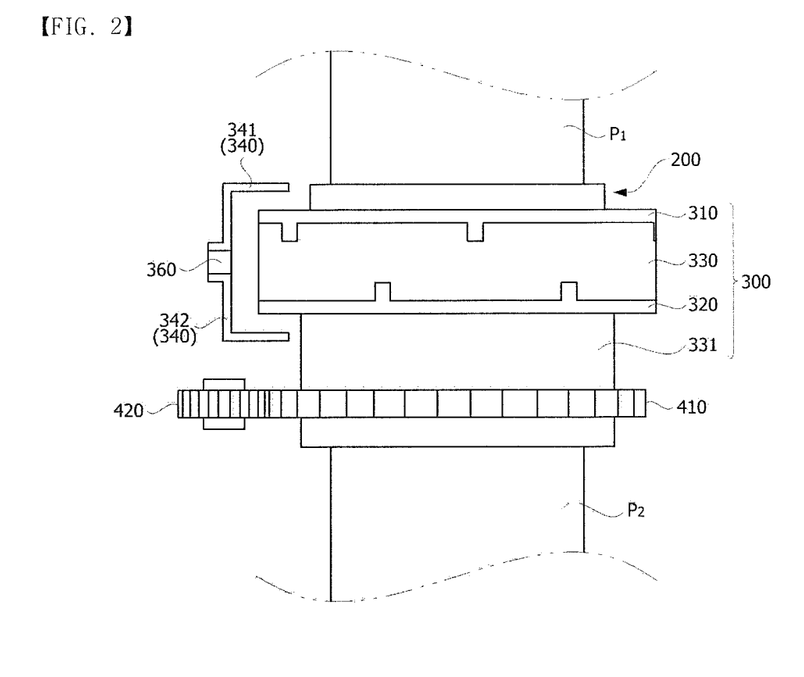
FIG. 2 is a concept view illustrating a state in which the TAS according to the embodiment of the present invention is coupled to a steering input shaft and a steering output shaft.

FIG. 1 is an exploded perspective view of a torque angle sensor (TAS) according to an embodiment of the present invention, and FIG. 2 is a concept view illustrating a state in which the TAS according to the embodiment of the present invention is coupled to a steering input shaft and a steering output shaft.

Referring to FIGS. 1 and 2, the TAS includes a case, a torque sensor module, and an angle sensor module.

The case includes a first case 110, a second case 120, and a third case 130. The torque sensor module is disposed between the first case 110 and the second case 120, and the angle sensor module is disposed between the second case 120 and the third case 130.

The second case 120 includes first fixing units 121 coupled with the first case 110, and a second fixing unit 122 coupled with a second fastening unit 132 of the third case 130. Therefore, the second case 120 may be a lower case of a torque sensor when the torque sensor is separately assembled, and may be an upper case of an angle sensor when the angle sensor is assembled.

The torque sensor module includes a rotor unit 200 connected with a first shaft P1, a stator unit 300 connected with a second shaft P2, a magnetic element 360 measuring a magnetic field generated between the rotor unit 200 and the stator unit 300, and a collector unit 340 disposed between the magnetic element 360 and the stator unit 300.

Any one among the first shaft P1 and the second shaft P2 defined in the specification may be a steering input shaft connected with a steering wheel of a vehicle, and the other one may be an output shaft connected with wheels of the vehicle. The torque sensor module detects a magnetic field generated according to distortion between the first shaft P1 and the second shaft P2.

The rotor unit 200 includes a rotor core 210 coupled with the first shaft P1 and a rotor magnet 220 attached to an outer circumferential surface of the rotor core 210. The rotor magnet 220 may be manufactured as a cylindrical magnet. The rotor unit 200 may be rotatably disposed in the stator unit 300.

The stator unit 300 includes a first stator ring 310, a second stator ring 320, and a holder 330. The first stator ring 310 and the second stator ring 320 are disposed to be separated from each other in an axial direction and include curved pieces (not shown) curved in opposing directions. The holder 330 is extruded and fixes the first stator ring 310 and the second stator ring 320. A protruding unit 331 is formed at one end of the holder 330 to couple with the second shaft P2.

The collector unit 340 includes a first collector 341 disposed to be adjacent to the first stator ring 310 and a second collector 342 disposed to be adjacent to the second stator ring 320. Ends of the first collector 341 and the second collector 342 are curved outward, and the magnetic element 360 is interposed therebetween.

The torque magnetic element 360 measures a magnetic field generated by a relative rotation of the rotor unit 200 and the stator unit 300. The torque magnetic element 360 may be one among an anisotropic magnetoresistive integrated circuit (AMR IC) and a hall integrated circuit (Hall IC). The torque magnetic element 360 may be electrically connected with a first printed circuit board 350.

The angle sensor module includes a main gear 410 rotating along with the first shaft P1 or the second shaft P2, and a first sub-gear 420 and a second sub-gear 430 engaged and coupled with the main gear 410.

The main gear 410 is inserted and fixed into the protruding unit 331 of the holder 330 to be integrally rotated with the second shaft P2. The sub gears 420 and 430 rotate according to a rotation of the main gear 410. Angle magnets 450 are mounted on the first sub-gear 420 and the second sub-gear 430, respectively. Diameters of the first sub-gear 420 and the second sub-gear 430 may be different from each other.

An angle magnetic element 460 detects a relative rotation of the angle magnets 450. The angle magnetic element 460 may be any one among the AMR IC and the Hall IC. The angle magnetic element 460 may be electrically connected to a second printed circuit board 470.

A connector 500 includes a connector housing 510, a first wire 521 connected with the first printed circuit board 350, a second wire 531 connected with the second printed circuit board 470, a first interface 520 connected with the first wire 521, and a second interface 530 connected with the second wire 531. The first interface 520 and the second interface 530 include a plurality of contact pins.

The first wire 521 and the second wire 531 are connected with the first printed circuit board 350 and the second printed circuit board 470, respectively, and thus outputs of the torque sensor module and the angle sensor module may be different from each other.

Figure 3:
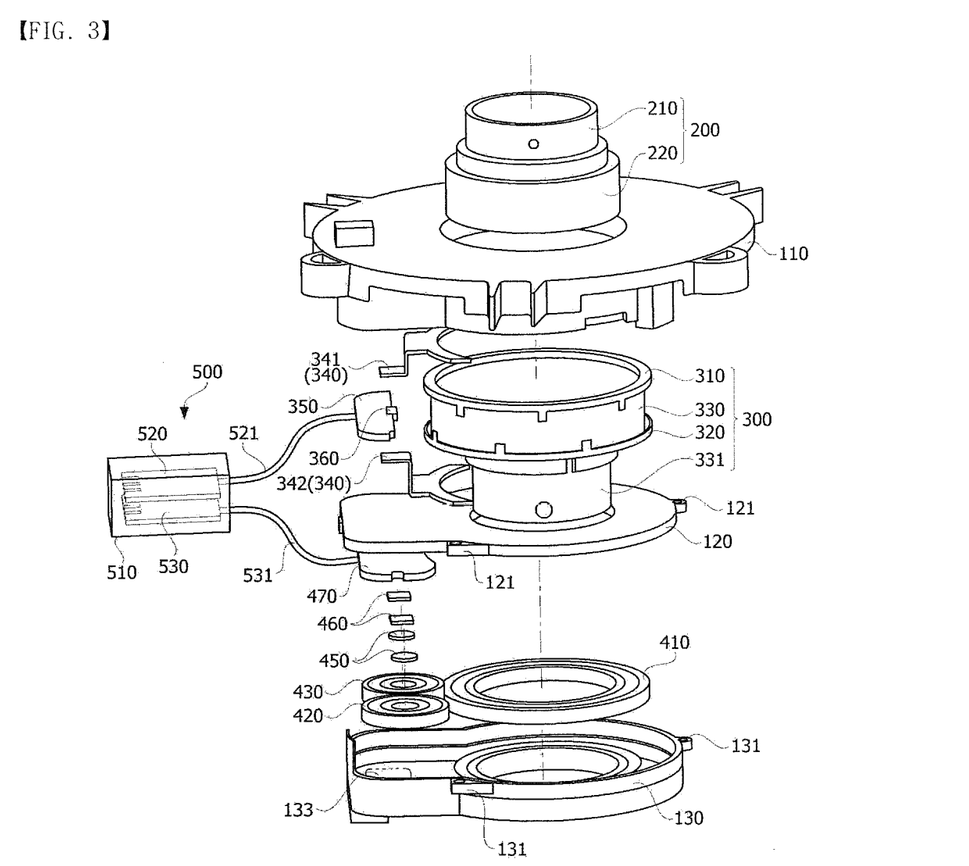
FIG. 3 is an exploded perspective view of a TAS according to another embodiment of the present invention.
Figure 4:
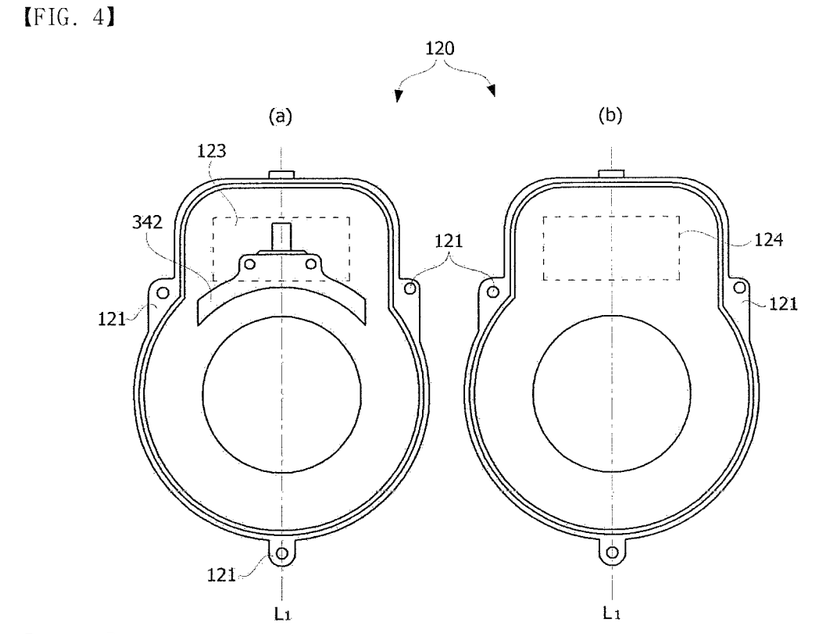
FIGS. 4A and 4B are plan views illustrating one surface and the other surface of a second case according to another embodiment of the present invention.

FIG. 3 is an exploded perspective view of a TAS according to another embodiment of the present invention, and FIGS. 4A and 4B are plan views illustrating one surface and the other surface of a second case according to another embodiment of the present invention.

A structure of the TAS in FIG. 3 is the same as described above, so more detailed descriptions will be omitted hereinafter, and a particular portion of the structure will be described in detail.

In the TAS of the present invention, first to third cases 110, 120, and 130 may be fixed using first fixing units 121 formed on an outer circumferential surface of the second case 120. For example, bolts (not shown) inserted into first fastening units 131 of the third case 130 pass through the first fixing units 121 to be coupled with the first case 110, and thus the first to third cases may be fixed.

Referring to FIG. 4A, a collector fixing unit 123 is provided on one surface of the second case 120. The collector fixing unit 123 may be a pair of protrusions into which the collector 342 is inserted, or may be a flat surface to which the collector 342 is attached.

As shown in FIG. 4B, a seating unit 124 is provided on the other surface of the second case 120 so that a sub-gear is rotatably supported. The seating unit 124 may be a groove into which the sub-gear is inserted.

A plurality of first fixing units 121 protrude from the outer circumferential surface of the second case 120. The first fixing units 121 are disposed to be symmetrical with respect to a longitudinal axis L1 when rotated 180°. Therefore, the second case 120 may be used as a lower case of a torque sensor and may be used as an upper case of an angle sensor. The first fixing units 121 may include screw holes into which the bolts are fastened.

Figure 5:
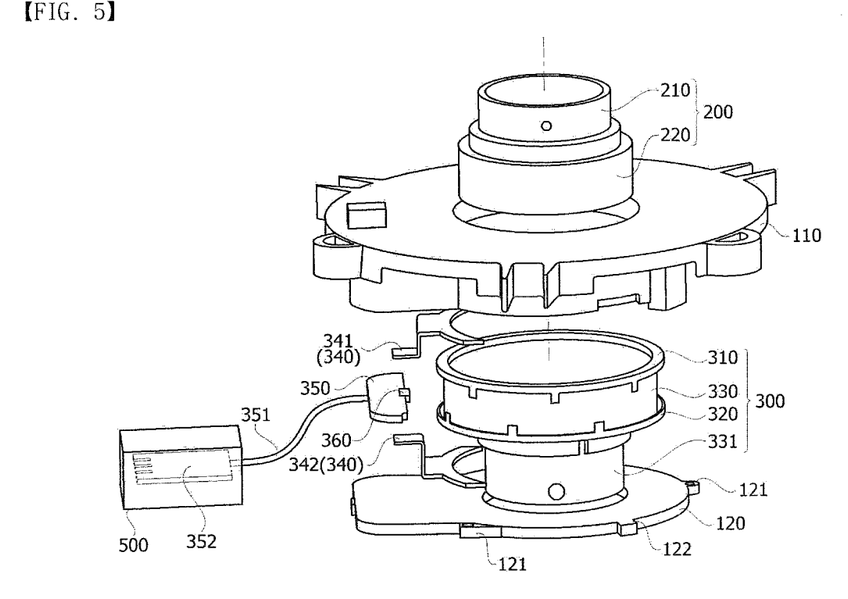
FIG. 5 is an exploded perspective view of a torque sensor according to an embodiment of the present invention.
Figure 6:
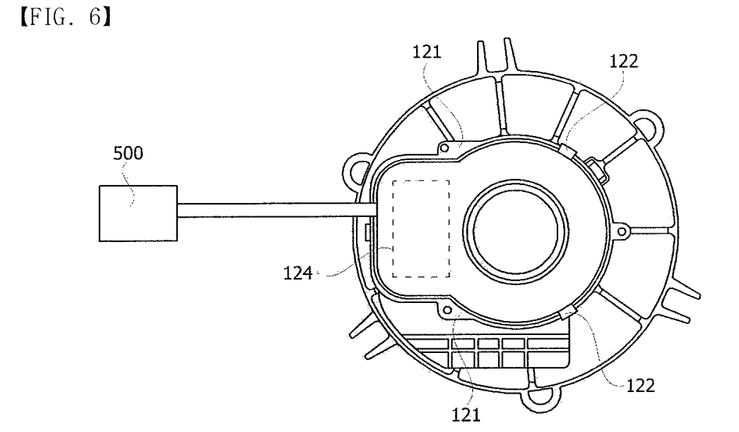
FIG. 6 is a rear view of the torque sensor according to the embodiment of the present invention.
Figure 7:
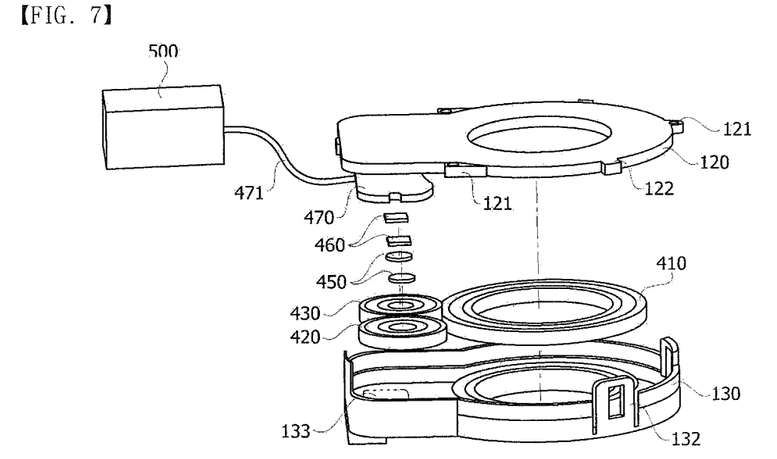
FIG. 7 is an exploded perspective view of an angle sensor according to the embodiment of the present invention.

FIG. 5 is an exploded perspective view of a torque sensor according to an embodiment of the present invention, FIG. 6 is a rear view of the torque sensor according to the embodiment of the present invention, and FIG. 7 is an exploded perspective view of an angle sensor according to an embodiment of the present invention.

Referring to FIG. 5, the torque sensor includes a first case 110, a second case 120 coupled to the first case 110, a stator unit 300, a rotor unit 200 disposed to rotate along with the stator unit 300, a torque magnetic element 360 detecting a magnetic field generated between the stator unit 300 and the rotor unit 200, a collector unit 340 disposed between the stator unit 300 and the torque magnetic element 360, and a first printed circuit board 350 electrically connected with the torque magnetic element 360. The torque sensor configured in the structure has the same structure as the torque sensor module of the above-described TAS, and thus detailed descriptions will be omitted hereinafter.

A plurality of first fixing units 121 and a second fixing unit 122 protrude from an outer circumferential surface of the second case 120. The first fixing units 121 have screw holes to be screwed and coupled with the first case 110. The second fixing unit 122 protrudes from the outer circumferential surface of the second case 120 and functions as an alignment mark when coupled with the first case 110. Alternatively, as described above in FIGS. 4A and 4B, the second case 120 may only have the first fixing units 121 disposed to be rotationally symmetrical to each other.

Referring to FIG. 7, the angle sensor includes a second case 120, a third case 130 coupled with the second case 120, a main gear 410 disposed between the second case 120 and the third case 130, sub-gears 420 and 430 engaged and coupled with the main gear 410, an angle magnet 450 integrally rotated along with the sub-gears 420 and 430, an angle magnetic element 460 detecting a rotation of the angle magnet, and a second printed circuit board 470 electrically connected with the angle magnetic element. The angle sensor configured in the structure has the same structure of the angle sensor module of the above-described TAS, and thus detailed descriptions will be omitted hereinafter.

The second case 120 of the angle sensor is manufactured to be the same as the second case 120 of the torque sensor described in FIG. 5. That is, the second case 120 may be used as a lower case of the torque sensor and may be used as an upper case of the angle sensor.

Therefore, the number of components is reduced and manufacturing costs are reduced, and the torque sensor, the angle sensor, and the TAS can be assembled on one assembly line. When the TAS is assembled, the torque angle sensor is coupled without any one among the lower case of the torque sensor and the upper case of the angle sensor, and thus the TAS is simply manufactured.

Figure 8:
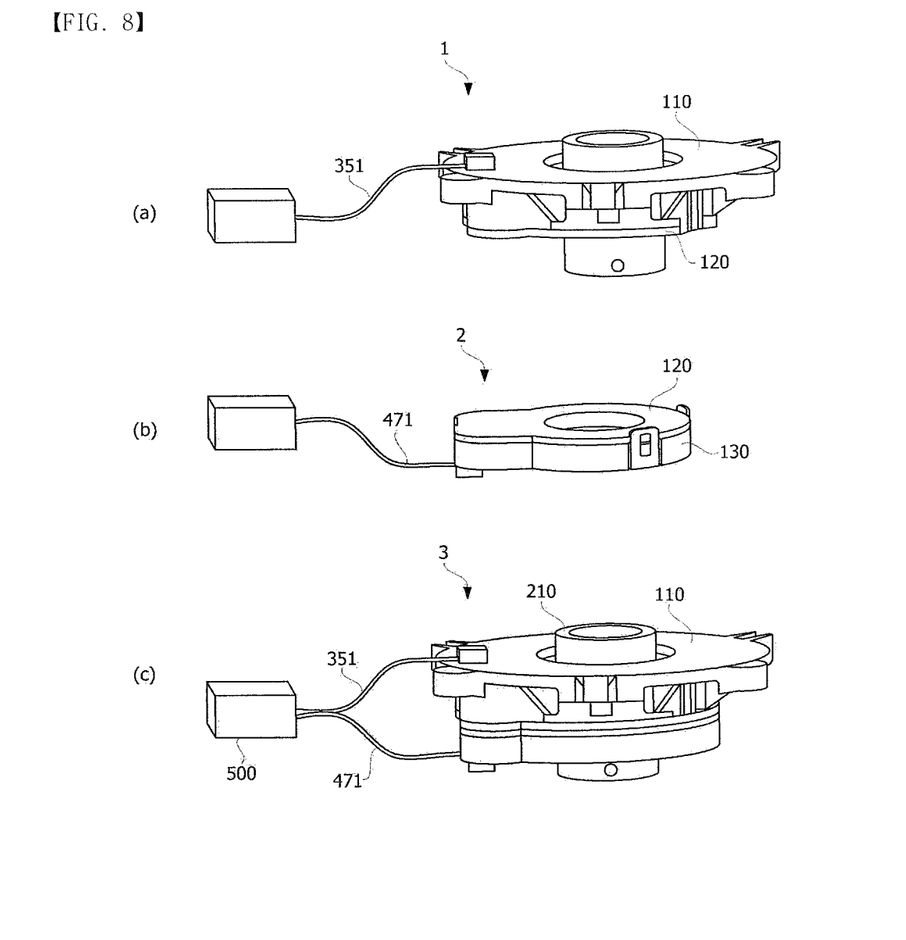
FIGS. 8A to 8C are concept views for illustrating a process in which the torque sensor and the angle sensor according to the embodiment of the present invention are coupled.

FIGS. 8A to 8C are concept views for illustrating a process in which the torque sensor and the angle sensor according to the embodiment of the present invention are coupled.

As shown in FIGS. 8A and 8B, one second case 120 may be used as a lower case of the torque sensor and an upper case of the angle sensor. That is, a torque sensor 1 may be manufactured by disposing a torque sensor module between a first upper case 110 and a first lower case 120, and an angle sensor 2 may be manufactured by disposing an angle sensor module between a second upper case 120 and a second lower case 130.

Also, as shown in FIG. 8C, a TAS 3 may be manufactured by coupling the torque sensor 1 and the angle sensor 2. When the TAS is manufactured, the TAS may be manufactured so that any one among the first lower case 120 of the torque sensor and the first upper case 120 of the angle sensor is omitted, but may be manufactured so that the first lower case 120 of the torque sensor and the second upper case 120 of the angle sensor are attached to each other.

The TAS 3 may connect a wire 351 connected with the torque sensor with a wire 471 connected with the angle sensor by one connector 500. Therefore, an output of the torque sensor and an output of the angle sensor may be different from each other. For example, the connector may use a 4-pin connector when the torque sensor and the angle sensor are separately manufactured, and may use an 8-pin connector when the TAS is manufactured.

DESCRIPTION OF SYMBOL

110: FIRST CASE
120: SECOND CASE
121: FIRST FIXING UNIT
122: SECOND FIXING UNIT

130: THIRD CASE
131: FIRST FASTENING UNIT
132: SECOND FASTENING UNIT
200: ROTOR UNIT
300: STATOR UNIT
500: CONNECTOR

The invention claimed is:

1. A torque sensor comprising:
a first case;
a second case coupled with the first case;
a third case coupled with the second case;
a torque sensor module disposed between the first case and the second case;
an angle sensor module disposed between the second case and the third case; and
a connector electrically connected to the torque sensor module and the angle sensor module,
wherein the torque sensor module includes a first printed circuit board disposed between the first case and the second case,
wherein the angle sensor module includes a second printed circuit board disposed between the second case and the third case,
wherein the connector is electrically connected with the first printed circuit board and the second printed circuit board, and
wherein the connector includes:
a connector housing;
a first wire connected with the first printed circuit board;
a second wire connected with the second printed circuit board;
a first interface connected with the first wire; and
a second interface connected with the second wire.

2. The torque sensor of claim 1, wherein the second case includes first fixing units disposed on an outer circumferential surface thereof and second fixing units disposed on the outer circumferential surface thereof,
wherein the first fixing units are coupled to the first case and the second fixing units are not coupled to the first case,
wherein the first fixing units and the second fixing units are rotationally symmetrical with respect to a longitudinal axis,
wherein the first fixing units and second fixing units protrude from the outer circumferential surface of the second case in a radial direction, and
wherein the first fixing units include screw holes.

3. The torque sensor of claim 2, wherein the first fixing units are coupled with the first case, and second fixing units are coupled with the third case.

4. The torque sensor of claim 2, wherein the first case has a circular shape and the second case has a different shape from the first case, and
wherein a diameter of the first case is larger than a width of the second case in a longitudinal direction.

5. The torque sensor of claim 1, wherein the torque sensor module includes:
a stator unit including a holder fixing a first stator ring and a second stator ring;
a rotor unit disposed in the stator unit;
a torque magnetic element detecting a magnetic field generated between the rotor unit and the stator unit, wherein the first printed circuit board is electrically connected with the torque magnetic element; and
a collector unit disposed between the torque magnetic element and the stator unit.

6. The torque sensor of claim 5, wherein the rotor unit is coupled with a first shaft, and the stator unit is coupled with a second shaft.

7. The torque sensor of claim 5, wherein the collector unit includes a first collector disposed on a side of the first stator ring, and a second collector disposed on a side of the second stator ring, and
the first collector is disposed in the first case, and the second collector is disposed in the second case.

8. The torque sensor of claim 1, wherein the angle sensor module includes:
a main gear;
at least one sub-gear engaged and coupled with the main gear;
an angle magnet integrally rotating along with the sub-gear; and
an angle magnetic element detecting a rotation of the angle magnet, wherein the second printed circuit board is electrically connected with the angle magnetic element.

9. The torque sensor of claim 8, wherein the second case includes a seating unit in which the sub-gear is rotatably disposed.

10. A torque sensor comprising:
a first case;
a second case coupled with the first case;
a third case coupled with the second case;
a torque sensor module disposed between the first case and the second case;
an angle sensor module disposed between the second case and the third case;
a first printed circuit board disposed between the first case and the second case;
a second printed circuit board disposed between the second case and the third case;
a first wire connected to the first printed circuit board; and
a second wire connected to the second printed circuit board,
wherein the first printed circuit board is spaced away from the second printed circuit board.

* * * * *